March 10, 1964

H. EPSTEIN 3,124,675

PHOTOELECTRIC TAPE READER

Filed June 30, 1961

2 Sheets-Sheet 1

Inventor:
Herman Epstein
By: Ray E. Snyder
Atty.

Inventor:
Herman Epstein
By: Ray E. Snyder
Atty.

United States Patent Office 3,124,675
Patented Mar. 10, 1964

3,124,675

PHOTOELECTRIC TAPE READER

Herman Epstein, Philadelphia, Pa., assignor to Omnitronics, Inc., Philadelphia, Pa., a corporation of Delaware Filed June 30, 1961, Ser. No. 121,037
3 Claims. (Cl. 235—61.11)

This invention relates to a photoelectric tape reader that is compatible for reading coded information from either perforated or printed tapes interchangeably.

Photoelectric tape readers of existing design have certain inherent limitations. For one, readers of the type wherein light is transmitted through the tape can read perforated tape but are incapable of reading printed or transparent perforated tapes. Secondly most photoelectric readers are sensitive to some predetermined variation or contrast in light intensity or signal level and normally operate within a limited range above or below some predetermined D.C. threshold level. The operation of these readers therefore can be adversely affected by D.C. drift due to power supply fluctuations, variations in light source intensity, or change in photosensitivity of the detectors. For some of the same reasons, reflective readers of existing design are incapable of accommodating tapes of different composition or color without amplifier adjustment because of the shift in D.C. threshold level produced by the difference in intensity of the reflected light. Another limitation of some existing designs is the fact that lint or paper fragments from punched tape tends to accumulate at the light pick up head which interferes with light transmission.

It is an object of the present invention to provide an improved photoelectric tape reader adapted to read all standard types of coded tapes of a given width interchangeably and without adjustment, and which is easily adjustable to accommodate tapes of different widths or number of code channels.

It is a more particular object to provide an improved photoelectric tape reader of the reflective type using a line source to cast a beam of light on a moving tape, a plurality of light pipes for picking up the reflected light from each channel on the tape and transmitting this light to a plurality of photoelectric detectors, and a rotating disc or light chopper for interrupting the light beams entering the detectors at some predetermined frequency so as to convert the effective D.C. light signals into modulated A.C. signals. The interrupted light beam in effect provides a carrier frequency which is modulated by the light signals obtained from the moving tape.

It is another object to provide a photoelectric tape reader of the type described in combination with a plurality of A.C. amplifiers connected to the photoelectric detectors for amplifying the light signals obtained from the moving tape. The A.C. amplifiers are effective to eliminate adverse effects of drift inherent in D.C. amplifiers or in the D.C. threshold level used to operate the reader.

It is another object to provide a tape reader having an adjustable guide block for the tape that is easily turned into one of several selective positions for accommodating tapes of different widths.

It is still another object to provide an improved light pick-up or reading head that maintains contact with the moving tape and that is self cleaning so that no dirt or lint accumulates to interfere with light transmission.

The invention consists of the novel constructions, arrangements and devices to be hereinafter described and claimed for carrying out the above-stated objects and such other objects as will appear from the following description of preferred embodiments of the invention, illustrated with reference to the accompanying drawings, wherein:

Figure 2:
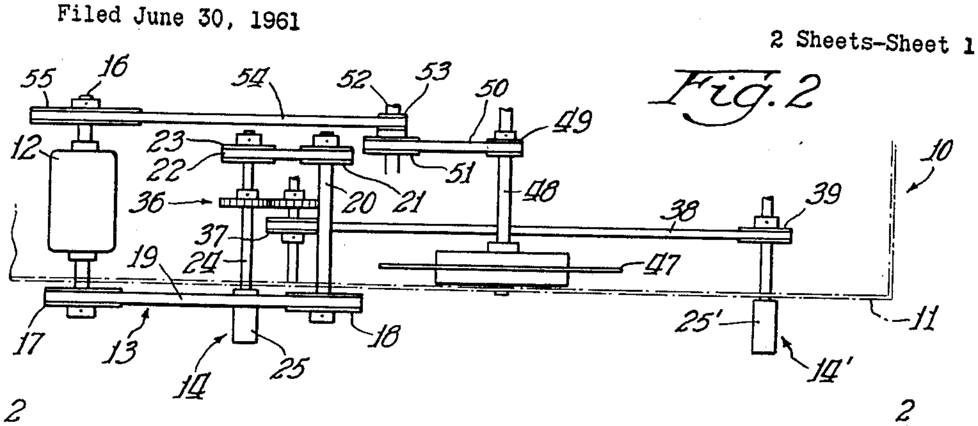
FIG. 2 is a top view taken on line 2—2 of FIG. 1.
Figure 1:
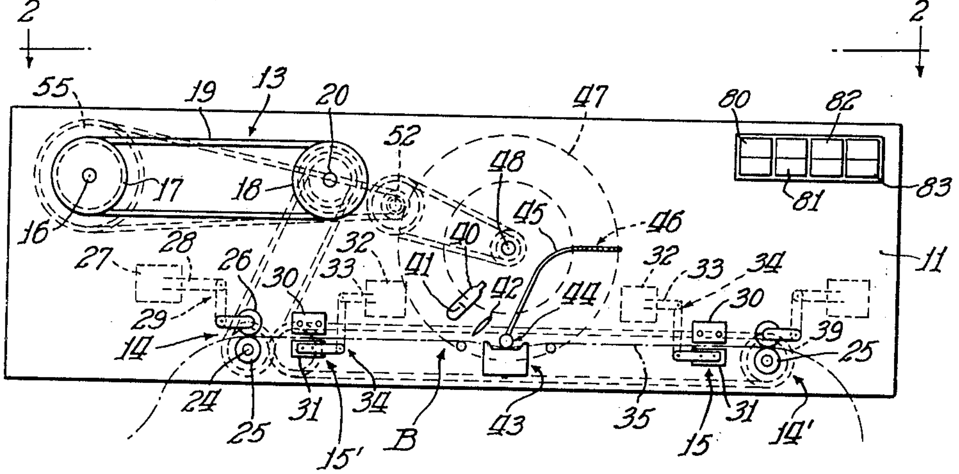
FIG. 1 is a front view, partially in schematic form of the photoelectric tape reader of the present invention.
Figure 5:
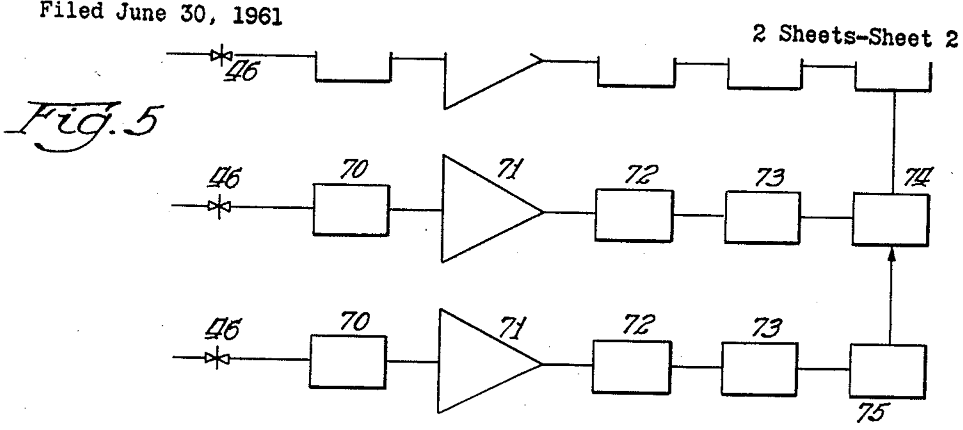
FIG. 5 is a block diagram of a portion of the electronic circuitry for the reader.
Figure 4:
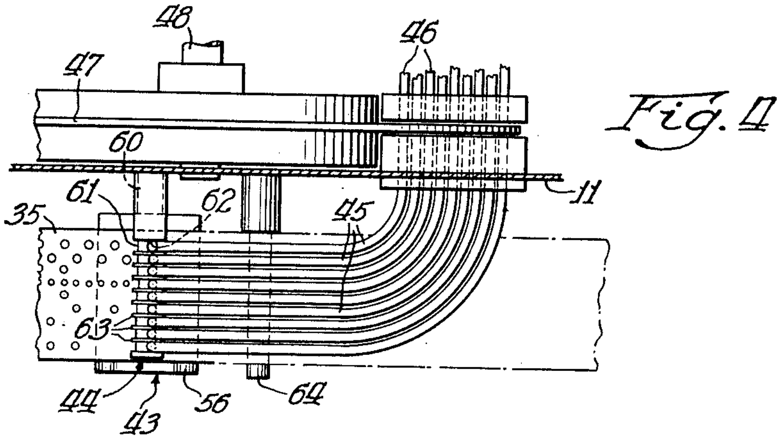
FIG. 4 is a view taken on line 4—4 of FIG. 3.
Figure 3:
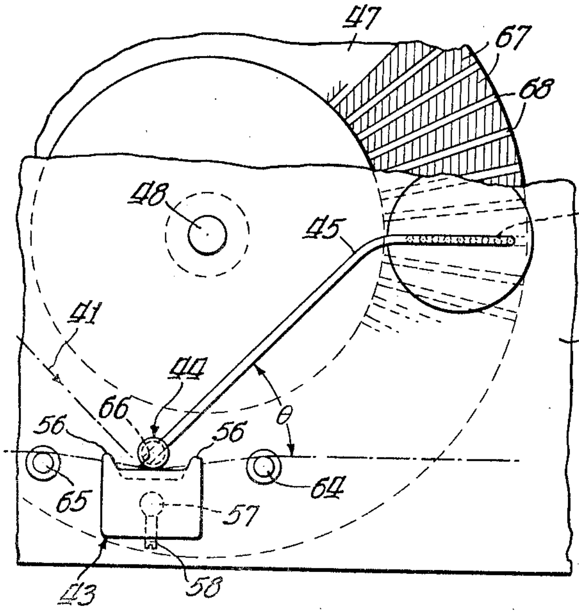
FIG. 3 is an enlarged fragmentary view of a portion of the optical reader section including the light interrupter disc.

Referring to the figures, the improved tape reader of the present invention includes a metal chassis 10 and a front rack-mounting panel 11, and may be described in terms of the following functional sections:

(A) Mechanical drive section
(B) Optical reader section
(C) Electronic amplifier section
(D) Electrical control section

*Mechanical Drive Section*

The mechanical drive section A comprises an electrical synchronous motor 12, an interchangeable pulley mechanism 13, a drive capstan 14, and a brake 15. A rotatable drive shaft 16 of the motor 12 extends through the front panel 11 and carries a drive pulley 17. The drive pulley 17 is interconnected with a second driven pulley 18 by means of a timing belt 19. The pulley 18 is mounted on one end of an idler shaft 20 which also extends through the front panel 11 and carries a third pulley 21 on its other end. The pulley 21 is connected by means of a belt 22 to a pulley 23 mounted on one end of a second idler shaft 24. The idler shaft 24 also extends through the front panel 11 and carries a drive roller 25 for the capstan 14.

The capstan 14 also includes a pinch roller 26 adapted to move into engagement with the drive roller 25. The capstan 14 is actuated by means of an electrical solenoid 27 having a movable armature 28 connected through a suitable linkage 29 to the pinch roller 26.

The brake 15 comprises a fixed shoe or pressure plate 30 mounted on the front panel 11 and a movable shoe 31 adapted to be moved into engagement with the fixed shoe 30. The brake 15 is actuated by means of an electrical solenoid 32 having a movable armature 33 interconnected by means of a suitable linkage 34 with the shoe 31.

A coded tape 35, from which information is to be read, is threaded horizontally across the front of the panel 11 between the brake shoes 30 and 31 and between the rollers 25 and 26. The capstan 14 and brake 15 are operated in alternation so that when one is engaged the other is released and vice versa. The pulley mechanism 13 is mounted on the front of the panel 11 so that the pulleys 17 and 18 can be easily replaced with pulleys of different relative diameters for providing different driving speeds for the tape 35.

A reversible drive feature may be provided by incorporating a secondary drive capstan 14′ and a secondary brake 15′ on opposite sides of the front panel from the capstan 14 and brake 15. The capstan 14′ may be interconnected with the idler shaft 24 by reversing gears 36, a pulley 37, a belt 38 and a second pulley 39 for driving a drive roller 25′.

*Optical Reader Section*

The optical reader section B comprises a light source 40 having a line filament 41, a focusing lens 42, a guide block 43, a light pick-up head 44, a plurality of light channel defining means or light pipes 45, a plurality of photosensitive detectors 46, and a light interrupter or chopper disc 47. The chopper disc 47 is mounted on a rotatable shaft 48 which carries a pulley 49 on one end thereof. The pulley 49 is driven by means of a belt 50 connected to a drive pulley 51 mounted on one end of an idler shaft 52. The shaft 52 also carries a second pulley 53 connected by means of a drive belt 54 to a third pulley 55 on the motor drive shaft 16.

The filament 41 of the source 40 casts a light beam which is focused by the lens 42 so as to form a fine line of light transverse to the tape 35 at a point immediately below the light pick-up head 44. In the present embodiment, the source 40 may be a lamp type GE 1922, and the photosensitive detectors 46 may be photoduo-diodes type IN 2175. One light pipe 45 is provided for each of the code channels on the tape 35 and the light reflected from the tape 35 is transmitted through the light pipes 45 and chopper disc 47 to the detectors 46. The guide block 43 immediately below the tape 35 is coated with relatively nonreflective paint. When perforated tape is used, the light passing through the holes of the tape is substantially absorbed by the block 43 or at least is reflected away from the pick-up head 44 and the difference in light intensity from that reflected from the tape comprises the light signal fed to the detectors 46.

Alternatively, if printed tape is used, the difference in intensity of the light reflected from the tape and from the dots or characters printed thereon produces the light signals. The present reader is thus capable of detecting light signals from all standard types of printed or perforated tapes currently in use.

The guide block 43 is formed with upwardly extending flanges 56 for constraining the tape 35 to move parallel to the light pipes 45. The guide block 43 is adjustably mounted on a shaft 57 and can be moved axially into any selective position to accommodate the width of the tape being used. A set screw 58 may be provided to hold the guide block 43 in any selected position.

The light pick-up head 44 comprises a cylindrical shaft 60 fixedly attached to the front panel 11 and formed with a plurality of parallel annular grooves 61. The shaft 60 is also formed with a plurality of radial holes 62 for accommodating the light pipes 45. The annular grooves 61 lie parallel to the code channels on the tape 35, and the walls 63 defining each of the annular grooves 61 confines the amount of light picked up from the tape 35 to the width of the code channel.

Two supporting guide pins 64 and 65 are disposed on opposite sides of the reader block 43. The tape 35 is threaded over each of the pins 64 and 65 and under the pick-up head 44. The tape 35 is also constrained to move parallel to the front panel by the flanges 56 on the guide block 43. The tape 35 rides in contact with the pins 64 and 65 and with the underside of the pick-up head 44. The pick-up head 44 depresses the tape 45 at a slight angle with respect to the horizontal, or with a plane parallel to the upper sides of the pins 64 and 65. This depression tends to eliminate flutter of the tape 35 at an image line 66 where the light source 40 casts an image.

The light pipes 45 are disposed at an acute angle $\theta$ with respect to the plane of the tape 35 and terminate in the pick-up head 44 at points adjacent to the transverse line 66. The light pipes 45 are also disposed with respect to the light source 40 so that the angle of incidence is equal to the angle of reflection from the tape 35. The shaft 60 of the light pick-up head 44 therefore serves two functions namely, it supports the light pipes 45 and acts as a guide for stabilizing the tape 35. The light pipes 45 and pick-up head 44 are so disposed with respect to the tape 35 that any lint or paper fragments from punched tape that may tend to accumulate at the light pick-up head 44 are swept away by the moving tape 35. This feature eliminates the necessity of stopping the reader periodically to clean the light pick-up head, which is a disadvantage of many conventional readers.

The light chopper disc 47 comprises a disc of transparent material having a plurality of opaque radiator sectors 67 painted or silk screened thereon. The sectors 67 are separated by transparent radial bands or apertures 68 of uniform width. The ends of light pipes 45 are disposed radially in line normal to the plane of the disc 47. The photosensitive detectors 46 are also disposed radially in line, colinear with the light pipes 45, and normal to the disc 47 on the opposite side thereof. The disposition of the light pipes 45 and detectors 46 normal to the disc 47 minimizes the amount of light loss due to reflection at the surface of the disc 47. The uniform width of the apertures 68 ensures that the same amount of light can pass from each of the light pipes 45 to its respective detector 46. The width of the sectors 67 is relatively greater than the width of the apertures 68 so as to compensate for the recovery time inherent in each of the detectors 46.

The disc 47 is rotated at a comparatively high speed so as to interrupt the light beams entering the detectors 46 at some constant frequency of, for example, 10 kilocycles per second. The interrupted light beam therefore comprises a light carrier frequency that is modulated by the light signals obtained from the tape 35.

*Electronic Amplifier Section*

The electronic amplifier section C of the reader comprises nine electrical channels, one for each of eight code channels on the tape and one for the sprocket channel. Each of the electrical code channels comprises a photosensitive detector 46, a buffer 70, an amplifier 71, a demodulator 72, an inverter amplifier 73, and a gate circuit 74. The sprocket channel comprises a detector 46, a buffer 70, an amplifier 71, a demodulator 72, and an inverter amplifier 73 substantially identical to those of each of the code channels and in addition includes a gating amplifier 75 connected to all of the gate circuits 74 of the eight code channels.

In operation, the signal detected by a photosensitive detector 46 consists of the ten kc. carrier wave produced by the chopper disc 47 and modulated by the light signals obtained from the tape. The carrier wave is transmitted through the buffer 70 and amplified by the amplifier 71 and then fed to the demodulator 72. The carrier frequency is removed by the demodulator 72, and the demodulated signal is formed into pulses and fed to the inverter amplifier 73. The output from the inverter amplifier is a negative going rectangular wave of a magnitude of approximately −12 volts which is fed to the gate circuit 74. This signal is transmitted through the gate circuit 74 when a triggering signal is obtained from the gating amplifier 75 of the sprocket channel. Since the sprocket holes on the tape are uniformly spaced, the output of the sprocket electrical channel is a series of rectangular, negative going pulses that are uniformly spaced. The sprocket channel thereby provides a timing or gating frequency which is fed to each of the gate circuits 74 simultaneously so that the information character outputs appear simultaneously at the gate circuit output terminals.

*The Electrical Control Section*

The electrical control section D for the reader comprises three control buttons (or four if the reversible drive feature is incorporated). The first control button is a power switch 80 for turning the power to the reader on or off. The second button is a tape load control switch 81 for use in initially loading the reader. The third button is a start-stop switch 82 for engaging the capstan 14 and driving the tape 35. (A fourth button would be a forward-reverse switch 83 for either direction of operation.)

In operation, the reader is turned on by pressing the power switch button 80. Turning on the power switch 80 energizes the motor 12 and brake solenoid 32 and automatically establishes a "Stop" condition for the reader. The tape load button 81 is then pressed before the tape 35 is threaded through the reader. Pressing the tape load button 81 is effective to deenergize both the solenoids 27 and 32 and thereby disengage both the brake 15 and capstan 14. After the tape 35 has been threaded through the reader, the button 81 is pressed again to place it in a "Ready" condition. Pressing the tape load switch 81 for the "Ready" condition is effective to reenergize the solenoid 32 for the brake 15 and thereby place the reader in a "Stop" condition and hold the tape 35 until the start-stop button 82 is pressed. Pressing the start-stop button 82 is effective to engage the capstan 14 and disengage the brake 15 so that the tape 35 is driven through the guide block 43.

The forward-reverse switch 83 in the forward condition is effective to energize the capstan 14 and the brake 15, and in the reverse condition is effective to energize the capstan 14′ and brake 15′. The start or stop condition is established by the switch 82 in the same manner for either direction of operation.

The start-stop switch 82 is also interconnected with the inhibtor gate circuit 75 of the sprocket channel and is effective to prevent the passage of pulses through any of the gate circuits 74 when a stop condition is established. This provision is effective to prohibit the passage of pulses even if the tape 35 is moved manually under the light pick-up head 44.

There has been provided by this invention an improved photoelectric tape reader offering several substantial advantages over existing instruments of this type. For one, by utilizing reflective light, a better signal to noise ratio is obtained over readers transmitting light through the tape, particularly so when reading transparent or translucent tapes. Secondly, the present reader offers a high degree of stability in operation because the use of a chopped light system permits the use of A.C. coupled amplifiers, thereby avoiding the drift inherent in D.C. amplifiers and photosensors. Thirdly, the present reader can read nearly all standard coded tapes interchangeably, whether punched or printed, colored or transparent without amplifier adjustments. The reader detects the difference in light intensity reflected from the tape or from the dots on, or holes in, the tape without distinction.

It is to be understood that the invention is not to be limited to the specific constructions, arrangements and devices shown and described, except only insofar as the claims may be so limited, as it will be apparent to those skilled in the art that changes may be made without departing from the principles of the invention.

I claim:

1. A photoelectric tape reader for reading coded information from a tape having a plurality of code channels, comprising means including a light source for directing light rays to strike the tape at a predetermined angle of incidence, a light pick-up head including a cylindrical body member riding in contact with the upper surface of the tape, a plurality of light channel defining means each having first and second end portions, the first end portions being oriented to pass only light rays reflected from the tape at a preassigned angle of reflection, thus to provide at the second end portions light signals related to the information on the respective code channels of the tape, a plurality of photosensitive detectors positioned in alignment with the second end portions of the light channel defining means, and spaced from the second end portions to define a gap therebetween, a rotating disc defining a plurality of spaced apart light apertures and extending into said gap, to modulate the output signals of said detectors at a frequency related both to the angular velocity of the disc and to the disc aperture spacing, a plurality of alternating current amplifier means respectively coupled to said detectors to amplify the modulated signals, a plurality of demodulator means respectively coupled to said amplifier means for demodulating the amplified signals to provide output signals related to the information in the respective code channels, a first tape guide means disposed at one side of the pick-up head to contact the lower surface of the tape, and a second tape guide means disposed at the other side of the pick-up head to contact the lower surface of the tape, passage of the tape over the first tape guide means, under the cylindrical body member of the pick-up head, and over the second tape guide means being effective to substantially eliminate tape flutter at the point of information detection.

2. A photoelectric tape reader as set forth in claim 1 in which said light pick-up head defines a plurality of locating apertures spaced apart in correspondence with the code channel spacing and oriented to pass only light rays reflected from the tape at a preassigned angle of reflection, and said first end portions of the light channel defining means are disposed in the respective locating apertures to effect proper alignment of the light channel defining means.

3. A photoelectric tape reader as set forth in claim 2 in which said preassigned angle of reflection is an acute angle substantially equal to said predetermined angle of incidence, and in which said first end portions of the light channel defining means are also disposed at the acute angle of reflection relative to the tape, whereby any lint or paper fragments carried by the tape are swept by the moving tape away from the light pick-up head to minimize interference with passage of the light rays to said light channel defining means.

References Cited in the file of this patent

UNITED STATES PATENTS

| | | |
|---|---|---|
| 1,753,961 | Zworykin | Apr. 8, 1930 |
| 2,001,730 | Ives | May 21, 1935 |
| 2,413,965 | Goldsmith | Jan. 7, 1947 |